United States Patent
Wang et al.

(10) Patent No.: US 9,853,987 B2
(45) Date of Patent: Dec. 26, 2017

(54) METHOD, APPARATUS AND SYSTEM FOR REALIZING SECURITY DETECTION IN HETEROGENEOUS NETWORK

(71) Applicant: ZTE Corporation, Shenzhen, Guangdong (CN)

(72) Inventors: Xin Wang, Shenzhen (CN); Feng He, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 73 days.

(21) Appl. No.: 14/762,807

(22) PCT Filed: Nov. 4, 2013

(86) PCT No.: PCT/CN2013/086516
§ 371 (c)(1),
(2) Date: Jul. 23, 2015

(87) PCT Pub. No.: WO2014/114121
PCT Pub. Date: Jul. 31, 2014

(65) Prior Publication Data
US 2015/0358340 A1    Dec. 10, 2015

(30) Foreign Application Priority Data
Jan. 25, 2013  (CN) .......................... 2013 1 0029731

(51) Int. Cl.
*H04L 29/06*    (2006.01)
*H04W 12/08*    (2009.01)
(Continued)

(52) U.S. Cl.
CPC ...... *H04L 63/1416* (2013.01); *H04L 63/1466* (2013.01); *H04W 12/08* (2013.01); *H04W 12/12* (2013.01); *H04W 92/10* (2013.01)

(58) Field of Classification Search
USPC .......................................... 726/23
See application file for complete search history.

(56) References Cited

U.S. PATENT DOCUMENTS

| | | | |
|---|---|---|---|
| 2014/0023015 A1 | 1/2014 | Frederiksen | |
| 2015/0133135 A1 | 5/2015 | Zhang et al. | |
| 2015/0327137 A1* | 11/2015 | Zhang | H04W 48/18 370/331 |

FOREIGN PATENT DOCUMENTS

| | | |
|---|---|---|
| CN | 101039314 A | 9/2007 |
| CN | 101951603 A | 1/2011 |

(Continued)

OTHER PUBLICATIONS

3GPP, 3rd Generation Partnership Project; Technical Specification Group Services and System Aspects; 3GPP System Architecture Evolution (SAE); SSecurity architecture, Jun. 2011, 3GPP, V10.1.1.*

(Continued)

*Primary Examiner* — Anthony Brown
*Assistant Examiner* — Samuel Ambaye
(74) *Attorney, Agent, or Firm* — Oppedahl Patent Law Firm LLC (57) ABSTRACT

Provided are a method, apparatus and system for realizing security detection in a heterogeneous network. UE establishes cross-Evolved NodeB (eNB) double/multiple connections with a MeNB and a LPN in an access network which is a kind of heterogeneous network, the LPN is responsible for data distribution, and the distribution is layered by RB; the MeNB receives a report message from the LPN through a backhaul interface between the MeNB and the LPN, and the report message contains the data count sent/received between the LPN and the UE; and the MeNB transmits CP information with the UE to compare the data counts actually sent/received between the access network and the UE to (Continued)

detect whether there is insertion of an attacker or not. According to the present disclosure, the heterogeneous network is deployed with the MeNB and the LPN, so that joint transmission service is provided for the UE; and moreover, the security performance of the network is further improved, the present disclosure is applicable to various backhauls, and good joint transmission service can be securely and efficiently provided for the UE.

14 Claims, 3 Drawing Sheets

(51) Int. Cl.
  *H04W 12/12* (2009.01)
  *H04W 92/10* (2009.01)

(56) References Cited

FOREIGN PATENT DOCUMENTS

| | | |
|---|---|---|
| CN | 102318388 A | 1/2012 |
| CN | 102638805 A | 8/2012 |
| EP | 2876839 A1 | 5/2015 |
| JP | 2015530782 A | 10/2015 |
| WO | 2012136256 A1 | 10/2012 |
| WO | 2014015478 A1 | 1/2014 |

OTHER PUBLICATIONS

Supplementary European Search Report in European application No. 13872848.0, dated Nov. 4, 2015.
3GPP TS 33.401 v10.1.1, mailed on Jun. 2011.
Hiroyuki Ishii, Yoshihisa Kishiyama, Hideaki Takahashi, A novel architecture for LTE-B :C-plane/ U-plane split and Phantom Cell concept, 2012 IEEE Globecom Workshops, IEEE, p. 624-630, mailed on Dec. 7, 2012.
International Search Report in international application No. PCT/CN2013/086516, dated Jan. 30, 2014.
English Translation of the Written Opinion of the International Search Authority in international application No. PCT/CN2013/086516, dated Jan. 30, 2014.
NEC, Consideration of the possible structures on the dual connectivity, 3GPP TSG-RAN WG2 Meeting #81 R2-130268, 3GPID, Jan. 18, 2013, URL, http://www.3gpp.org/ftp/tsg_ran/WG2_RL2/TSGR2_81/Docs/R2-130268.zip.

* cited by examiner

METHOD, APPARATUS AND SYSTEM FOR REALIZING SECURITY DETECTION IN HETEROGENEOUS NETWORK

TECHNICAL FIELD

The present disclosure relates to the field of communications, and in particular to a method, apparatus and system for realizing security detection in a heterogeneous network.

BACKGROUND

Along with the constant evolution of a wireless communication technology and protocol standards, a mobile packet service has experienced great development, and a data throughput capability of a single terminal has been continuously improved. For example, a Long Term Evolution (LTE) system may support data transmission at a maximum downlink rate of 100 Mbps within a 20 M bandwidth, and a data transmission rate of a follow-up LTE Advanced (LTE-A) system may further be increased, and may even reach 1 Gbps.

The astronomical increase of a data service amount of a terminal imposes enormous pressure and challenges on a service capability and deployment strategy of the terminal. A carrier company needs to enhance an existing network deployment and communication technology on one hand, and on the other hand, expects to accelerate the popularization of a new technology and network extension, thereby fulfilling the aim of rapidly improving network performance. Along with the development of a mobile communication system up to now, it is more and more difficult to provide economic, flexible and high-capability service only by enhancing macro networks, so a network strategy of deploying Low Power Nodes (LPN) to provide a small cell coverage becomes an attractive solution, particularly in the aspect of providing good user experiences in an indoor/outdoor hotspot area with a large transmitted data count.

Enhancement in LPN deployment has been confirmed by the Third Generation Partnership Project (3GPP) to be one of the most interesting issues in future network development. LPNs are deployed in a coverage of a macro network, which may make transmission, mobility, security, interference and the like greatly different from those of a conventional macro network, and in a process of independently providing service for a terminal by each Evolved NodeB (eNB), there may exist multiple problems, and service requirements on a large data count and a high mobility cannot be met; because of practical limitations, historical factors and the like, backhauls of the LPNs are diversified, and each interface has different characteristics, and is limited to coordinate and interact with the macro network. Therefore, in a scenario deployed with LPNs, an important topic urgent to be solved is how to maintain a good coordination mechanism with a Macro eNB (MeNB) by virtue of its characteristics to provide optimal communication service for User Equipment (UE) to further meet requirements of higher bandwidth, higher performance, lower cost, higher security and applicability to multiple backhauls in the future development of an LTE communication system, but there is yet no specific and effective technical support.

SUMMARY

In view of this, the main purpose of the embodiments of the present disclosure is to provide a method, apparatus and system for realizing security detection in a heterogeneous network, so as to improve the security performance of the network during the providing of joint transmission service for UE.

In order to achieve the purpose, the technical solutions of the embodiments of the present disclosure are implemented as follows.

A method for realizing security detection in a heterogeneous network is provided, wherein UE establishes cross-eNB double/multiple connections with a MeNB and an LPN in an access network which is a kind of heterogeneous network, the LPN is responsible for data distribution, and the data distribution is layered by Radio Bearers (RB); the MeNB receives a report message from the LPN through a backhaul interface between the MeNB and the LPN, and the report message contains a data count sent/received between the LPN and the UE; the method includes that:

the MeNB transmits Control Plane (CP) information with the UE to compare data counts actually sent/received between the access network and the UE to detect whether there is insertion of an attacker or not.

Before the MeNB receives the report message, the LPN may notify the MeNB of a data count sent/received on a Data Radio Bearer (DRB) between the LPN and the UE according to a bearer configured by the MeNB for distribution transmission by the LPN;

the report message at least contains a UE Identifier (ID) (UE_ID), an ID of each DRB (DRB_ID) configured by the MeNB for the UE for the distribution transmission at the LPN, and a data count sent/received on each DRB.

The process that the LPN sends the report message may include that:

when a value of a data count on an LPN side reaches a predetermined value or when a cycle time is reached, sending, by the LPN, the report message to the MeNB; or when the MeNB determines to initiate security detection, sending, by the MeNB, a data count request message to the LPN to request the LPN to report the data count sent/received between the LPN and the UE; and returning, by the LPN, a corresponding statistical result to the MeNB according to an indication of the MeNB after receiving the data count request message.

The process that the MeNB transmits the CP information with the UE to compare the data counts actually sent/received between the access network and the UE to detect whether there is the insertion of the attacker or not may include that:

the UE receives a counter check message from the MeNB, and compares a data count, indicated in the counter check message, sent/received on each DRB with the data count received/sent on each DRB by the UE; when two data counts corresponding to a certain DRB are inconsistent, the UE returns a counter check response message containing an ID of the certain DRB and an actual data count generated on the certain DRB in uplink and downlink directions to the MeNB; and the MeNB autonomously judges whether the attacker inserts a data packet or not, and performs corresponding processing.

The method further may include that:

when the LPN sends the report message or when the MeNB receives the report message, the number of data packets transmitted within a transmission time of the report message is added to a specific data count corresponding to the report message; or when the LPN sends the report message, the LPN attaches a time value to indicate the data count sent/received between the LPN and the UE up to a moment when the time value is reached; and moreover, the MeNB sends a counter check message to the UE after receiving the report message from the LPN, the counter check message containing DRBs between the MeNB and the UE, data counts generated on DRBs between the LPN and the UE in uplink and downlink directions, and the time value.

An apparatus for realizing security detection in a heterogeneous network is provided, which is a MeNB, wherein UE establishes cross-eNB double/multiple connections with an LPN and the MeNB in the heterogeneous network, the LPN in the access network is responsible for data distribution, and the data distribution is layered by RBs; the MeNB is configured to receive a report message from the LPN through a backhaul interface between the MeNB and the LPN, the report message containing a data count sent/received between the LPN and the UE; and the MeNB is further configured to: transmit CP information with the UE to compare data counts actually sent/received between the access network and the UE to detect whether there is insertion of an attacker or not.

The MeNB may be configured to, when determining to initiate security detection, send a data count request message to the LPN to request the LPN to report the data count sent/received between the LPN and the UE, and receive a corresponding statistical result returned by the LPN according to an indication of the MeNB.

When transmitting the CP information with the UE to detect whether there is the insertion of the attacker or not, the MeNB may be configured to:

receive from the UE a counter check response message including an ID of a DRB and an actual data count on the DRB in uplink and downlink directions, so as to judge whether the attacker inserts a data packet or not, and perform corresponding processing.

The MeNB may be further configured to:

when receiving the report message, add the number of data packets transmitted within a transmission time of the report message to a specific data count corresponding to the report message; or after receiving the report message from the LPN, send a counter check message to the UE, the counter check message containing DRBs between the MeNB and the UE, and data counts generated on DRBs between the LPN and the UE in uplink and downlink directions.

An apparatus for realizing security detection in a heterogeneous network is provided, which is an LPN, wherein UE establishes cross-eNB double/multiple connections with a MeNB and the LPN in the heterogeneous network, the LPN in the access network is responsible for data distribution, and the data distribution is layered by RBs; and the LPN is configured to send a report message through a backhaul interface between the LPN and the MeNB, the report message containing a data count sent/received between the LPN and the UE.

The LPN may be configured to: notify the MeNB of a data count sent/received on a DRB between the LPN and the UE according to a bearer configured by the MeNB for distribution transmission by the LPN;

the report message at least contains a UE ID (UE_ID), an ID of each DRB (DRB_ID) configured by the MeNB for the UE for the distribution transmission by the LPN, and a data count sent/received on each DRB.

When sending the report message, the LPN may be configured to:

when a value of a data count on an LPN side reaches a predetermined value or when a cycle time is reached, send the report message to the MeNB; or receive a data count request message from the MeNB, and return a corresponding statistical result to the MeNB according to an indication of the MeNB.

The LPN may be further configured to:

when sending the report message, add the number of data packets transmitted within a transmission time of the report message to a specific data count corresponding to the report message; or when sending the report message, attach a time value to indicate the data count sent/received between the LPN and the UE up to a moment when the time value is reached.

A system for realizing security detection in a heterogeneous network is provided, which includes a MeNB and an LPN, wherein UE establishes cross-eNB double/multiple connections with the MeNB and the LPN in the heterogeneous network, the LPN in the access network is responsible for data distribution, and the data distribution is layered by RBs;

the MeNB is configured to receive a report message from the LPN through a backhaul interface between the MeNB and the LPN, the report message containing a data count sent/received between the LPN and the UE; the MeNB is further configured to: transmit CP information with the UE to compare data counts actually sent/received between the access network and the UE to detect whether there is insertion of an attacker or not; and the LPN is configured to send the report message through the backhaul interface between the LPN and the MeNB, the report message containing the data count sent/received between the LPN and the UE.

A system for realizing security detection in a heterogeneous network is provided, which includes an access network in a heterogeneous network form and UE, wherein the UE establishes cross-eNB double/multiple connections with a MeNB and an LPN in the heterogeneous network, the LPN in the access network is responsible for data distribution, and the data distribution is layered by RBs;

the access network is configured to: perform interaction on the data count sent/received between the UE and the LPN in the access network, and transmit CP information with the UE to compare the data counts actually sent/received between the access network and the UE to detect whether there is insertion of an attacker or not.

The access network may include the MeNB and the LPN, wherein the MeNB is configured to receive a report message from the LPN through a backhaul interface between the MeNB and the LPN, the report message containing the data count sent/received between the LPN and the UE; the MeNB is further configured to: transmit the CP information with the UE to compare the data counts actually sent/received between the access network and the UE to detect whether there is the insertion of the attacker or not; and the LPN is configured to send the report message through the backhaul interface between the LPN and the MeNB, the report message containing the data count sent/received between the LPN and the UE.

The UE may be configured to receive a counter check message from the MeNB, and compare a data count, indicated in the counter check message, sent/received on each Data Radio Bearer (DRB) with the data count received/sent on each DRB by the UE itself; and when two data counts corresponding to a certain DRB are inconsistent, the UE is configured to return a counter check response message containing an identifier (ID) of the certain DRB and an actual data count generated on the certain DRB in uplink and downlink directions to the MeNB.

According to such a technology for realizing security detection in a heterogeneous network in the embodiments of the present disclosure, a report message may be received from an LPN through a backhaul interface between the MeNB and the LPN, the report message containing a data count sent/received between the LPN and the UE; and the MeNB transmits CP information with the UE to compare the data counts actually sent/received between the access network and the UE to detect whether there is the insertion of an attacker or not. In this way, the heterogeneous network consisting of the MeNB and the LPN may provide joint transmission service for the UE, and moreover, the security performance of the network is further improved.

DETAILED DESCRIPTION

The embodiments of the present disclosure provide a heterogeneous network deployed with a MeNB and an LPN, so as to provide joint transmission service for UE. Moreover, the embodiments of the present disclosure further provide a method for improving the security performance of the heterogeneous network. The embodiments of the present disclosure are applicable to various backhauls, and can provide good joint transmission service securely and efficiently for UE.

Figure 1:
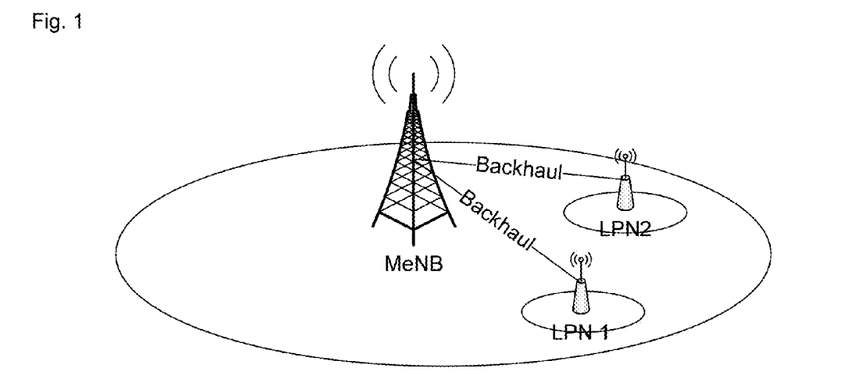
FIG. 1 is a schematic deployment diagram of a heterogeneous network according to an embodiment of the present disclosure.

As shown in FIG. 1, one or more PLNs are deployed within a coverage (such as hotspot area) of the MeNB, and the LPN may be a low-power micro eNB (Pico eNB), a relay node, or a Home eNB (HeNB). Correspondingly, a backhaul interface between the LPN and the MeNB may be a wired interface (such as a fibre interface) or a wireless interface (such as a Un interface).

Figure 2:
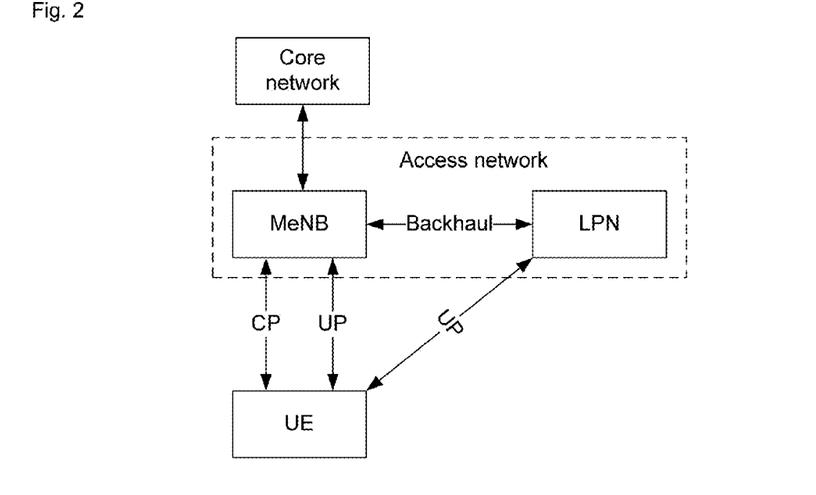
FIG. 2 is a schematic diagram of a system architecture according to an embodiment of the present disclosure.

FIG. 2 is a schematic diagram of a system architecture according to an embodiment of the present disclosure, and the system shown in FIG. 2 includes a Core Network (CN), an access network consisting of a MeNB and an LPN, and UE capable of supporting a multiple-data-stream transceiver mechanism. All of the CN, the access network and the UE may be used in an LTE network.

In this embodiment, the MeNB establishes a CP connection with the CN and a User Plane (UP) connection with the UE respectively, a UP connection exists between the LPN and the UE, and there is a backhaul interface capable of transmitting control signalling and user data between the MeNB and the LPN.

Furthermore, from the aspect of a CP, the MeNB is responsible for all control signalling between the MeNB and the UE on one hand, and on the other hand, is responsible for CP information required by the LPN so as to enable the LPN to have necessary UE context information and to configure each protocol layer to effectively schedule the UE; and from the aspect of a UP, the MeNB sends a part of user data received from the CN to the UE through the UP connection between the MeNB and the UE according to a distribution strategy determined by itself, and sends the other part of the user data to the LPN through the backhaul interface, and then the LPN sends the other part of the user data to the UE through an air interface.

Furthermore, the UE data distribution strategy determined by the MeNB may take an RB as distribution granularity, that is, for services with different Quality of Service (QoS), the MeNB may determine to transmit the services to the UE through different carrier links according to QoS characteristics of the services respectively. For example, a real-time service (such as a voice) is transmitted on a link between the MeNB and the UE; and a delay-tolerant service (such as video downloading) with a large data count is distributed to the LPN, and then is transmitted to the UE.

Figure 3:
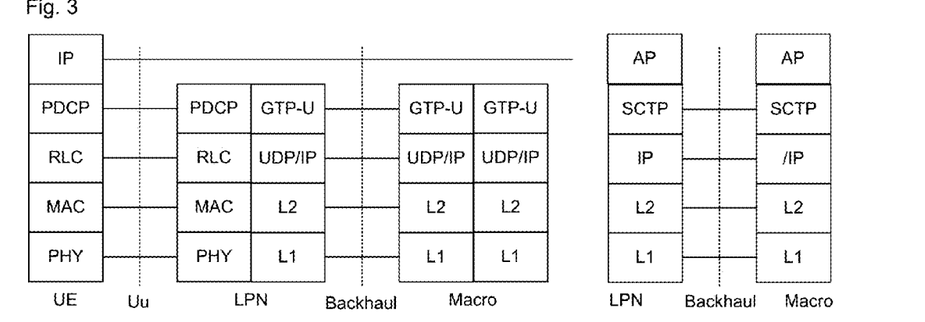
FIG. 3 is a schematic diagram of a protocol stack according to an embodiment of the present disclosure.

FIG. 3 illustrates a protocol stack form of the distribution strategy, and the protocol stack form includes that the MeNB transmits distributed data to the LPN and then transmits the distributed data to a UP part of the UE (uplink data is transmitted in an opposite direction), and to a CP part (there is no CP between the LPN and the UE) of the interface between the MeNB and the LPN, wherein the protocol stack form of the backhaul interface between the MeNB and the LPN may be another form according to the wire/wireless character and the like of a specific interface. It can be seen that Packet Data Convergence Protocol (PDCP) entities and their lower-layer protocol entities (Radio Link Control (RLC) sublayers, Medium Access Control (MAC) sublayers and Physical (PHY) layers) on a network side are located in the MeNB and the LPN, when an RB is taken as distribution granularity.

In such a manner, the MeNB with a heavier load may distribute a part of user data to the LPN for transmission, and the UE is not required to execute a switching flow when moving among small cells, so a signalling load of the network is reduced; and for the UE, band broadening for multi-carrier transmission may better meet a requirement of a service with a large data count, and more power can be saved for transmission between the UE and a closer LPN, and thus a user experience can be well improved.

In a process that a user performs data transmission with the access network by virtue of the UE through a wireless interface, the network side is required to adequately provide and ensure security. The access network is required to know whether the data count sent/received by the network side is consistent with the data count received/sent by the UE so as to detect whether an attacker inserts a radio link and sends an attack data packet to the user or not. Therefore, the system architecture according to the embodiment of the present disclosure has a security problem. On the network side, PDCP entities corresponding to the RB are located at two different nodes respectively, therefore, the MeNB is not sure about the number of data packets actually sent to the UE by the LPN at a certain moment (the same for uplink); and on the other hand, since there is no CP signalling interaction between the LPN and the UE, interaction about related information cannot be performed according to an existing detection program. Therefore, if there is an attacker inserting the link between the LPN and the UE and sending an attack data packet to the UE, the MeNB cannot timely learn about such a condition, which affects security.

In order to improve the security of the system architecture according to the embodiment of the present disclosure to enable the network side to discover a malicious attack as soon as possible, the embodiment of the present disclosure discloses a solution as follows:

the MeNB receives a report message from the LPN through the backhaul interface between the MeNB and the LPN, the report message containing a data count sent/received between the LPN and the UE; and the MeNB transmits CP information with the UE to compare data counts actually sent/received between the access network and the UE to detect whether there is insertion of an attacker or not.

When sending the report message, the LPN may notify the MeNB of the data count sent/received on a DRB between the LPN and the UE within a certain time period according to the bearer configured by the MeNB for the distribution transmission by the LPN. The message at least contains an ID of the UE (UE_ID), an ID of each DRB (DRB_ID) configured by the MeNB for the UE for the distribution transmission by the LPN and the size (PDCP COUNT) of the data sent/received on each DRB.

There may be multiple mechanisms for the LPN to send the report message, such as the following two:

1: a one-way message: when a value of a data count on the network side reaches a certain predetermined value or when a certain cycle time is reached, the LPN sends the report message to the MeNB. The predetermined value and the cycle time may specifically be configured by the MeNB, a carrier company/Operation Administration and Management (OAM); and information for configuration may be attached when the MeNB requests the LPN to establish a bearer.

2: a two-way message: the MeNB determines whether to perform security detection or not according to a condition of the network side (information reported by the UE may also be adopted for assistance). When determining to initiate security detection, the MeNB sends a data count request message to the LPN to request the LPN to report the data count sent/received between the LPN and the UE; and the LPN returns a corresponding statistical result to the MeNB according to an indication of the MeNB after receiving the data count request message.

Furthermore, the COUNT value reported to the MeNB by the LPN may only include the most important first bytes but not include the unit, the tens and the like at the tail, that is, a certain error is allowed. However, an interface delay between the MeNB and the LPN may be greater, that is, when the information reported to the MeNB by the LPN reaches the MeNB, the data count sent/received between the UE and the LPN has been changed, and a change value has also exceeded a range allowed by the error. Therefore, to avoid misjudgement, the network side requires certain regulation and optimization. For example, there may be two forms:

1: the access network (the MeNB or the LPN) estimates the delay occurring at the backhaul interface and the number of the data packets transmitted through the distribution bearer to a certain extent, and then the LPN may add the number of the data packets transmitted within the transmission time of the message to the specific data count corresponding to the report message when the LPN sends the report message or the MeNB receives the report message. The specific execution node is autonomously coordinated and determined by the network side;

2: the LPN attaches a time value, such as a System Frame Number (SYN), to the report message to indicate the data count sent/received between the LPN and the UE up to a SYN moment, when sending the report message.

The MeNB sends a counter check message to the UE after receiving the report (also called a reply) message from the LPN, the counter check message containing the DRBs between the MeNB and the UE, the data counts generated on the DRBs between the LPN and the UE in uplink and downlink directions, and the time value. The data counts described here only include the most important first bytes (such as the first 25 bytes) of the COUNT value, that is, errors in the last bytes are allowed.

Furthermore, if a previous message reported by the LPN contains a time value indicated by the SFN, then the MeNB may also contain the SFN when sending a message to the UE (obviously, the COUNT value indicated by the MeNB is also the data count generated up to the SFN moment), so that the UE can accurately perform comparison.

After receiving the message from the MeNB, the UE compares the count, in the message, of the data sent/received on each DRB with the data count received/sent on each DRB by itself; and if the first bytes of the COUNT values of a certain DRB are inconsistent, then the UE returns a counter check response message containing the ID of the DRB and the actual data counts (all bytes) of the DRB in uplink and downlink directions to the MeNB.

Finally, the MeNB autonomously judges whether there is a data packet inserted by the attacker or not, and performs corresponding processing.

By the method for realizing security detection, in the system architecture according to the embodiment of the present disclosure, signalling is transmitted between two eNBs in the access network which is a kind of heterogeneous network, so that the MeNB responsible for all control signalling can comprehensively and accurately perform data packet number check with the UE to timely and accurately discover a possible attacker and ensure the security of the network.

The present disclosure is further described below with reference to different embodiments.

Figure 4:
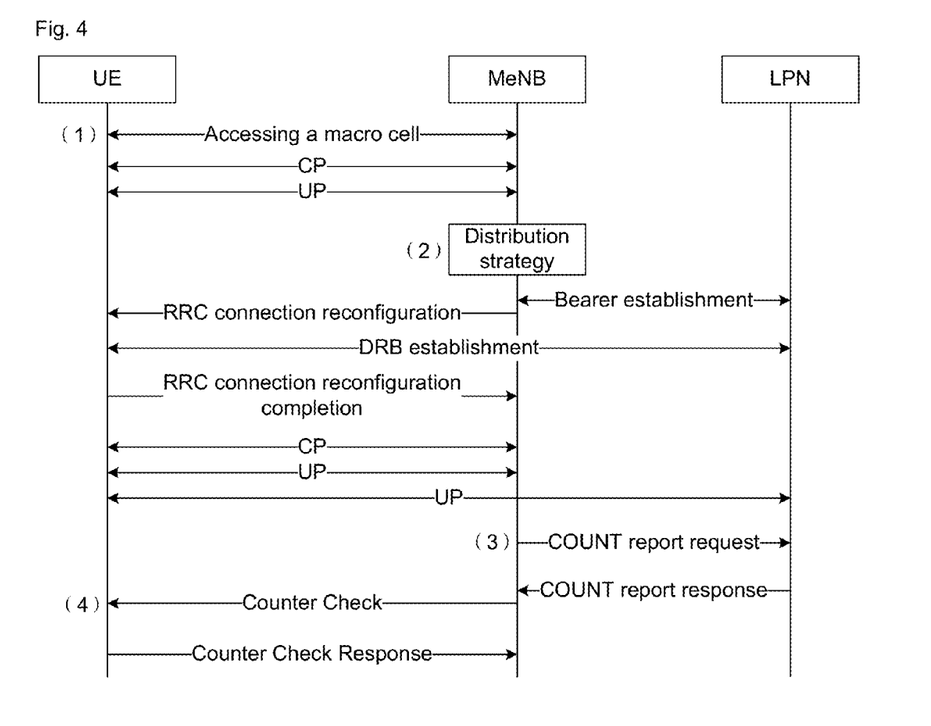
FIG. 4 is a flowchart of security detection according to embodiment 1 of the present disclosure.

Embodiment 1: a MeNB and an LPN are deployed in a network, and the two nodes form an access network with the system architecture according to the embodiment of the present disclosure. In a process of providing joint transmission service for UE by the MeNB and the LPN, the MeNB requests the LPN to report the data count sent/received between the LPN and the UE, and the LPN gives a corresponding reply according to indication information in a request from the MeNB. As shown in FIG. 4, specific steps include:

step 1: the UE accesses a macro cell established by the MeNB according to an existing LTE flow, and establishes a CP connection capable of transmitting CP information and a UP connection capable of transmitting user data. The CP connection is a Radio Resource Control (RRC) connection;

step 2: the MeNB determines to distribute a certain service data stream (recorded as RB2 of QoS2) of the UE to the LPN for transmission and transmit another service data stream (recorded as RB1 of QoS1) on a radio link between the MeNB and the UE according to information such as a network load and a measurement report of the UE;

the MeNB transmits necessary information such as a UE context and an RB2 parameter to the LPN to request to provide joint transmission service for the UE, and the LPN returns a response message after agreeing. Then the MeNB notifies the UE through an RRC Connection Reconfiguration MESSAGE to add a small cell, and the UE establishes DRB2 with the LPN according to the indication of the MeNB, and returns a complete message, such as an RRC connection reconfiguration complete message, to the MeNB.

At this point, there are still CP and UP connections (such as DRB1) existing between the UE and the MeNB, and meanwhile, there is also a UP connection (DRB2) existing between the UE and the LPN. For example, in the downlink direction, the MeNB forwards an Internet Protocol (IP) packet of QoS2 received from a CN to the LPN through a backhaul interface, and the LPN performs Layer 2 (L2) (such as PDCP, RLC and MAC) and L1 protocol layer processing on the received IP packet, and then transmits the IP packet to the UE on DRB2 through a wireless interface;

It should be noted that the above two steps are described by taking the flow of providing joint transmission for the UE by the LPN and the MeNB as an example, and a communication state in which transmission bearers are established between the UE and two/multiple eNBs respectively may further be achieved by another procedure;

step 3: during data transmission between the UE and the access network, the network side is required to provide and ensure adequate security. The MeNB responsible for all control signalling is required to know whether the data count sent/received by the network side is consistent with the data count received/sent by the UE to detect whether an attacker inserts a radio link and sends an attach data packet to the user. Therefore, the MeNB is required to know the count of interaction data between the LPN and the UE, that is, the MeNB sends a COUNT report request message to the LPN, the message at least containing UE_ID and a DRB ID (DRB2 in the example) to indicate the specific UE with a requirement on statistics and the count, required to be reported to the MeNB, of the data sent/received on the DRB of the UE by the LPN. Optionally, the COUNT report request message of the MeNB may further contain a group of UE Ids;

after receiving the COUNT report request message from the MeNB, the LPN makes a statistics on the data count sent/received on the DRB of the UE by itself according to the indication in the message, and returns a COUNT report response message to the MeNB (the message containing the ID of the UE, the ID of the DRB and the data count sent/received on each DRB). According to the indication in the COUNT report request message, the data count may only include the most important first bytes of the COUNT value (for example, the data count does not include the unit and tens at the tail of the COUNT value, but only includes all of the highest first bytes), that is, a certain error is allowed;

in addition, the COUNT report request message sent to the LPN by the MeNB may further contain at least one of the following signal elements: a COUNT value step length, a cycle time, an SFN and the like, besides the abovementioned necessary signal elements;

optionally, the MeNB may notify the LPN of a subsequent response message returning moment (besides the first response message returned instantly after the LPN receives the COUNT report request message), and the response message may be triggered by an event or cyclically reported. Event triggering means that the MeNB notifies the LPN of a threshold (or called a step length), and the LPN reports once to the MeNB every time when the COUNT value of the data packets sent/received on DRB2 is increased by a step length. Cyclic reporting means that the MeNB notifies the LPN of a cycle time, and the LPN reports once to the MeNB every time when the cycle time is reached;

optionally, the network side is required to take a data count difference caused by a delay at the backhaul interface into account, and in detail, in the process that the report message of the LPN reaches the MeNB through the backhaul interface, the sending/receiving of the data packets on DRB2 is still continued, that is, when the MeNB receives the report message, the data count sent/received on DRB2 has been changed. Therefore, the network side is required to estimate and optimize the difference to a certain extent to avoid misjudgement when judging whether there is an attacker or not during check. Such optimization may be attachment of a data count when the check message is subsequently sent to the UE based on the prediction of the network side over the data count generated within the delay at the interface on DRB2 according to QoS2. Or, the LPN includes a time value SFN at which the statistics of the data count is stopped into the report message under the indication of the request message from the MeNB; and particularly during event-triggered reporting, the LPN is required to notify the MeNB of a specific moment at which the data count reaches a certain threshold; and step 4: the MeNB sends a counter check message to the UE, the counter check message containing the IDs (DRB1, DRB2) of the DRBs and the most important first bytes (such as the first 25 bytes, that is, errors, probably caused by air interface transmission time and the like, of the tail bytes are allowed) of COUNT_Uplink and COUNT_Downlink of each DRB. Corresponding to step 3, the counter check message may further contain an SFN value, that is, the UE is notified to only compare the counts of the data received/sent up to the SFN.

The UE compares the data count in the counter check message with the data count received/sent on each DRB by itself, and if the two data counts (the first bytes) are inconsistent, the UE indicates the ID of the DRB and the count (all the bytes of the COUNT value) of the data actually received/sent on the DRB by itself in the counter check response message, and returns the counter check response message to the MeNB; and if the two data counts are consistent, the counter check response message from the UE does not contain any information about the DRB.

The MeNB judges whether there is an attacker or not according to a specific configuration, and performs corresponding subsequent processing after receiving the counter check response message from the UE.

Figure 5:
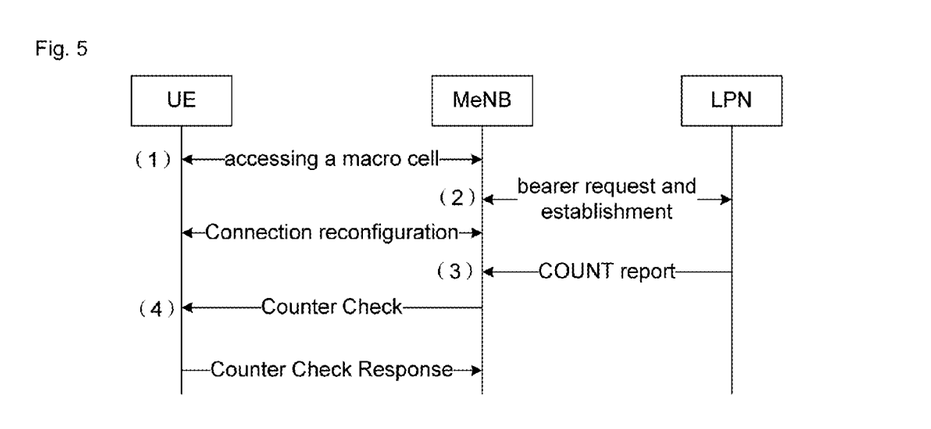
FIG. 5 is a flowchart of security detection according to embodiment 2 of the present disclosure.

Embodiment 2: a deploying scenario is the same as that in embodiment 1, and in a process of providing joint transmission service for the UE by the MeNB and the LPN, the LPN actively reports the data count sent/received between the LPN and the UE (the MeNB is not required to request and reply). As shown in FIG. 5, specific steps include:

step 1: like step 1 in embodiment 1, UE accesses a macro cell, and establishes CP and UP connections;

step 2: like step 2 in embodiment 1, the MeNB distributes a certain service data stream (recorded as RB2 of QoS2) of the UE to the LPN for transmission, and transmits remaining service data stream (recorded as RB1 of QoS1) on a radio link between the MeNB and the UE. A control and data forwarding tunnel is established between the MeNB and the LPN; and the UE establishes DRB2 with the LPN to transmit the distributed data according to an indication of the MeNB, and there are still CP and UP connections (DRB1) existing between the UE and the MeNB;

step 3: data counts of point-to-point transmission (sending/receiving) between eNBs in the access network and accessing users should be consistent to avoid the insertion of attackers over links. However, in the system architecture according to the embodiment of the present disclosure, there is no CP link between the LPN and the UE, so an existing counter check flow cannot be executed. Therefore, the LPN is required to notify the MeNB of the count of interaction data between the LPN and the UE, that is, the LPN sends a report message to the MeNB, the report message containing an ID of the UE, an ID of the DRB (DRB2 in the example) and the data count sent/received on each DRB (the data count may only include the most important first bytes of the COUNT value, that is, a certain error is allowed). Optionally, the report message of the LPN may contain IDs of multiple pieces of UE, IDs of DRBs for data transmission between the UE and the LPN respectively, and the counts of data sent/received on the DRBs by the LPN respectively;

furthermore, the LPN may be triggered by an event to send or may cyclically report the report message to the MeNB. Event triggering means that the LPN reports once to the MeNB every time when the data packets sent/received on DRB2 by the LPN are added by a predetermined value. Cyclic reporting means that the LPN reports once to the MeNB every time when the cycle time is reached. The predetermined value or the cycle time may specifically configured for the LPN by the MeNB when a bearer transmission tunnel is established with the LPN, and may further be configured for the LPN by a carrier company/OAM;

furthermore, the network side is required to take a data count difference caused by a delay at the backhaul interface into account. The network side (the MeNB or the LPN) may estimate the data count generated within the interface delay on DRB2 according to QoS2, and then the MeNB attaches the data count to the check message when sending the check message to the UE. Or, the report message of the LPN contains a time value SFN at which the statistics of the data count is stopped; and particularly during event-triggered reporting, the LPN is required to notify the MeNB of a specific moment at which the data count reaches a certain threshold;

step 4: the MeNB may send the counter check message to the UE after receiving the report message from the LPN (a moment at which the message is sent is specifically determined by the MeNB), the message containing the IDs (DRB1, DRB2) of the DRBs and the most important first bytes (such as the first 25 bytes, that is, errors, probably caused by air interface transmission time and the like, of the tail bytes are allowed) of COUNT_Uplink and COUNT_Downlink of each DRB. Corresponding to step 3, the counter check message may further contain an SFN value, that is, the UE is notified to only compare the counts of the data received/sent up to the SFN.

The UE compares the data count in the counter check message with the data count received/sent on each DRB by itself, and if the two data counts (the first bytes) are inconsistent, the UE indicates the ID of the DRB and the count (all the bytes of the COUNT value) of the data actually received/sent on the DRB by itself in the counter check response message, and returns the counter check response message to the MeN.

The MeNB judges whether there is an attacker or not according to a specific configuration, and performs corresponding subsequent processing after receiving the counter check response message of the UE.

Figure 6:
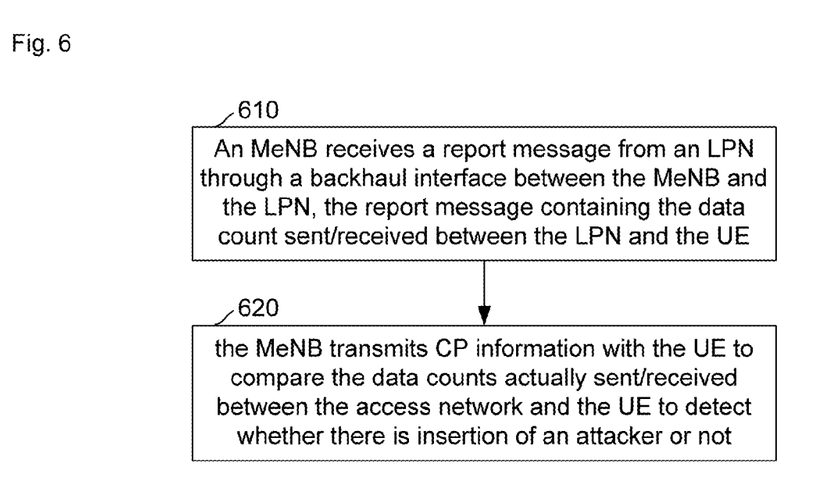
FIG. 6 is a simple flowchart of security detection according to an embodiment of the present disclosure.

From the above, the operation of realizing security detection in the heterogeneous network according to the embodiment of the present disclosure may represent a flow shown in FIG. 6, and the flow includes the following steps:

step 610: the MeNB receives a report message from the LPN through a backhaul interface between the MeNB and the LPN, the report message containing the data count sent/received between the LPN and the UE; and step 620: the MeNB transmits CP information with the UE to compare the data counts actually sent/received between the access network and the UE to detect whether there is the insertion of an attacker or not.

From the above, regardless of the method, the apparatus and the system, by the technology for realizing security detection in the heterogeneous network in the embodiments of the present disclosure, a report message may be received from the LPN through a backhaul interface between the MeNB and the LPN, the report message containing the data count sent/received between the LPN and the UE; and the MeNB transmits CP information with the UE to compare the data counts actually sent/received between the access network and the UE to detect whether there is the insertion of an attacker or not. In this way, the heterogeneous network consisting of the MeNB and the LPN may provide joint transmission service for the UE, and moreover, the security performance of the network is further improved.

Those skilled in the art may have the understanding that all or a part of the steps in the method may be completed by related hardware instructed by a program, and the program may be stored in a computer-readable storage medium, such as a read-only memory disc, a magnetic disc and a compact disc. Optionally, all or a part of the steps of the embodiments may also be implemented by one or more integrated circuits. Correspondingly, each module/unit in the embodiments may be implemented in form of hardware, or may also be implemented in form of software function module. The embodiments of the present disclosure are not limited to a combination of hardware and software in any specific form.

The above are only the preferred embodiments of the present disclosure and not intended to limit the scope of protection of the present disclosure.

INDUSTRIAL PRACTICABILITY

The present disclosure provides a method, apparatus and system for realizing security detection in a heterogeneous network. UE establishes cross-eNB double/multiple connections with a MeNB and an LPN in an access network which is a kind of heterogeneous network, the LPN is responsible for data distribution, and distribution is layered by RBs; the MeNB receives a report message from the LPN through a backhaul interface between the MeNB and the LPN, and the report message contains a data count sent/received between the LPN and the UE; and the MeNB transmits CP information with the UE to compare the data counts actually sent/received between the access network and the UE to detect whether there is insertion of an attacker or not. According to the present disclosure, the heterogeneous network is deployed with the MeNB and the LPN, so that joint transmission service is provided for the UE; and moreover, the security performance of the network is further improved, the present disclosure is applicable to various backhauls, and good joint transmission service can be securely and efficiently provided for the UE.

What is claimed is:

1. A method for realizing security detection in a heterogeneous network, wherein User Equipment (UE) establishes cross-Evolved NodeB (eNB) double/multiple connections with a Macro eNB (MeNB) and a Low Power Node (LPN) in an access network which is a kind of heterogeneous network, the LPN is responsible for data distribution, and the data distribution is layered by Radio Bearers (RB);

the MeNB receives a report message from the LPN through a backhaul interface between the MeNB and the LPN, and the report message contains a data count sent/received between the LPN and the UE; the method comprising:

transmitting Control Plane (CP) information between the MeNB and the UE to compare data counts actually sent/received between the access network and the UE to detect whether there is insertion of an attacker or not;

wherein before the MeNB receives the report message, notifying, by the LPN, the MeNB of a data count sent/received on a Data Radio Bearer (DRB) between the LPN and the UE according to a bearer configured by the MeNB for distribution transmission by the LPN; and wherein the report message at least contains a UE Identifier (ID) (UE_ID), an ID of each DRB (DRB_ID) configured by the MeNB for the UE for the distribution transmission at the LPN, and a data count sent/received on each DRB.

2. The method according to claim 1, wherein sending, by the LPN, the report message comprises: when a value of a data count on an LPN side reaches a predetermined value or when a cycle time is reached, sending, by the LPN, the report message to the MeNB; or when the MeNB determines to initiate security detection, sending, by the MeNB, a data count request message to the LPN to request the LPN to report the data count sent/received between the LPN and the UE; and returning, by the LPN, a corresponding statistical result to the MeNB according to an indication of the MeNB after receiving the data count request message.

3. The method according to claim 1, wherein transmitting the CP information between the MeNB and the UE to compare the data counts actually sent/received between the access network and the UE to detect whether there is the insertion of the attacker or not comprises: receiving, by the UE, a counter check message from the MeNB, and comparing a data count, indicated in the counter check message, sent/received on each DRB with the data count received/sent on each DRB by the UE; when two data counts corresponding to a certain DRB are inconsistent, returning, by the UE, a counter check response message containing an ID of the certain DRB and an actual data count generated on the certain DRB in uplink and downlink directions to the MeNB; and autonomously judging, by the MeNB, whether the attacker inserts a data packet or not, and performing corresponding processing.

4. The method according to claim 1, further comprising: when the LPN sends the report message or when the MeNB receives the report message, adding the number of data packets transmitted within a transmission time of the report message to a specific data count corresponding to the report message; or when the LPN sends the report message, attaching, by the LPN, a time value to indicate the data count sent/received between the LPN and the UE up to a moment when the time value is reached; and moreover, sending, by the MeNB, a counter check message to the UE after receiving the report message from the LPN, the counter check message containing DRBs between the MeNB and the UE, data counts generated on DRBs between the LPN and the UE in uplink and downlink directions, and the time value.

5. An apparatus for realizing security detection in a heterogeneous network, which is a Macro Evolved NodeB (MeNB), wherein User Equipment (UE) establishes cross-eNB double/multiple connections with a Low Power Node (LPN) and the MeNB in the heterogeneous network, the LPN in the access network is responsible for data distribution, and the data distribution is layered by Radio Bearers (RB);

the MeNB is configured to receive a report message from the LPN through a backhaul interface between the MeNB and the LPN, the report message containing a data count sent/received between the LPN and the UE; and the MeNB is further configured to: transmit Control Plane (CP) information with the UE to compare data counts actually sent/received between the access network and the UE to detect whether there is insertion of an attacker or not;

the MeNB is further configured to, when determining to initiate security detection, send a data count request message to the LPN to request the LPN to report the data count sent/received between the LPN and the UE, and receive a corresponding statistical result returned by the LPN according to an indication of the MeNB;

wherein the report message at least contains a UE Identifier (ID) (UE_ID), an ID of each DRB (DRB_ID) configured by the MeNB for the UE for the distribution transmission at the LPN, and a data count sent/received on each DRB.

6. The apparatus according to claim 5, wherein, when transmitting the CP information with the UE to detect whether there is the insertion of the attacker or not, the MeNB is configured to: receive from the UE a counter check response message comprising an ID of a Data Radio Bearer (DRB) and an actual data count on the DRB in uplink and downlink directions, so as to judge whether the attacker inserts a data packet or not and perform corresponding processing.

7. The apparatus according to claim 5, wherein the MeNB is further configured to: when receiving the report message, add the number of data packets transmitted within a transmission time of the report message to a specific data count corresponding to the report message; or after receiving the report message from the LPN, send a counter check message to the UE, the counter check message containing DRBs between the MeNB and the UE, and data counts generated on DRBs between the LPN and the UE in uplink and downlink directions.

8. An apparatus for realizing security detection in a heterogeneous network, which is a Low Power Node (LPN), wherein User Equipment (UE) establishes cross-Evolved NodeB (eNB) double/multiple connections with a Macro eNB (MeNB) and the LPN in the heterogeneous network, the LPN in the access network is responsible for data distribution, and the data distribution is layered by Radio Bearers (RB); and the LPN is configured to send a report message through a backhaul interface between the LPN and the MeNB, the report message containing a data count sent/received between the LPN and the UE;

the LPN is further configured to notify the MeNB of a data count sent/received on a Data Radio Bearer (DRB) between the LPN and the UE according to a bearer configured by the MeNB for distribution transmission by the LPN;

wherein the report message at least contains a UE Identifier (ID) (UE_ID), an ID of each DRB (DRB_ID) configured by the MeNB for the UE for the distribution transmission at the LPN, and a data count sent/received on each DRB.

9. The apparatus according to claim 8, wherein, when sending the report message, the LPN is configured to: when a value of a data count on an LPN side reaches a predetermined value or when a cycle time is reached, send the report message to the MeNB; or receive a data count request message from the MeNB, and return a corresponding statistical result to the MeNB according to an indication of the MeNB.

10. The apparatus according to claim 8, wherein the LPN is further configured to: when sending the report message, add the number of data packets transmitted within a transmission time of the report message to a specific data count corresponding to the report message; or when sending the report message, attach a time value to indicate the data count sent/received between the LPN and the UE up to a moment when the time value is reached.

11. A system for realizing security detection in a heterogeneous network, comprising a Macro Evolved NodeB (MeNB) and a Low Power Node (LPN), wherein User Equipment (UE) establishes cross-eNB double/multiple connections with the MeNB and the LPN in the heterogeneous network, the LPN in the access network is responsible for data distribution, and the data distribution is layered by Radio Bearers (RB);
 the MeNB is configured to receive a report message from the LPN through a backhaul interface between the MeNB and the LPN, the report message containing a data count sent/received between the LPN and the UE; the MeNB is further configured to transmit Control Plane (CP) information with the UE to compare data counts actually sent/received between the access network and the UE to detect whether there is insertion of an attacker or not; and
 the LPN is configured to send the report message through the backhaul interface between the LPN and the MeNB, the report message containing the data count sent/received between the LPN and the UE;
 the LPN is further configured to notify the MeNB of a data count sent/received on a Data Radio Bearer (DRB) between the LPN and the UE according to a bearer configured by the MeNB for distribution transmission by the LPN;
 wherein the report message at least contains a UE Identifier (ID) (UE_ID), an ID of each DRB (DRB_ID) configured by the MeNB for the UE for the distribution transmission at the LPN, and a data count sent/received on each DRB.

12. A system for realizing security detection in a heterogeneous network, comprising an access network in a heterogeneous network form and User Equipment (UE), wherein the UE establishes cross-Evolved NodeB (eNB) double/multiple connections with a Macro eNB (MeNB) and a Lower Power Node (LPN) in the heterogeneous network, the LPN in the access network is responsible for data distribution, and the data distribution is layered by Radio Bearers (RB);
 wherein the access network is configured to perform interaction on the data count sent/received between the UE and the LPN in the access network, and transmit Control Plane (CP) information with the UE to compare the data counts actually sent/received between the access network and the UE to detect whether there is insertion of an attacker or not;
 wherein the access network comprises the MeNB and the LPN, wherein the MeNB is configured to receive a report message from the LPN through a backhaul interface between the MeNB and the LPN, the report message containing the data count sent/received between the LPN and the UE; the MeNB is further configured to: transmit the CP information with the UE to compare the data counts actually sent/received between the access network and the UE to detect whether there is the insertion of the attacker or not; and
 the LPN is configured to send the report message through the backhaul interface between the LPN and the MeNB, the report message containing the data count sent/received between the LPN and the UE;
 the LPN is further configured to notify the MeNB of a data count sent/received on a Data Radio Bearer (DRB) between the LPN and the UE according to a bearer configured by the MeNB for distribution transmission by the LPN;
 wherein the report message at least contains a UE Identifier (ID) (UE_ID), an ID of each DRB (DRB_ID) configured by the MeNB for the UE for the distribution transmission at the LPN, and a data count sent/received on each DRB.

13. The system according to claim 12, wherein the UE is configured to receive a counter check message from the MeNB, and compare a data count, indicated in the counter check message, sent/received on each Data Radio Bearer (DRB) with the data count received/sent on each DRB by the UE itself; and when two data counts corresponding to a certain DRB are inconsistent, the UE is configured to return a counter check response message containing an identifier (ID) of the certain DRB and an actual data count generated on the certain DRB in uplink and downlink directions to the MeNB.

14. The method according to claim 2, wherein transmitting the CP information between the MeNB and the UE to compare the data counts actually sent/received between the access network and the UE to detect whether there is the insertion of the attacker or not comprises: receiving, by the UE, a counter check message from the MeNB, and comparing a data count, indicated in the counter check message, sent/received on each DRB with the data count received/sent on each DRB by the UE; when two data counts corresponding to a certain DRB are inconsistent, returning, by the UE, a counter check response message containing an ID of the certain DRB and an actual data count generated on the certain DRB in uplink and downlink directions to the MeNB; and autonomously judging, by the MeNB, whether the attacker inserts a data packet or not, and performing corresponding processing.

* * * * *